Oct. 27, 1931.    S. W. MILLER    1,828,977
METHOD OF ANNEALING FUSION WELDS
Filed Oct. 5, 1928

Samuel W. Miller, INVENTOR
ATTORNEYS.

Patented Oct. 27, 1931

1,828,977

UNITED STATES PATENT OFFICE

SAMUEL W. MILLER, OF HOLLIS, NEW YORK, ASSIGNOR TO OXWELD ACETYLENE COMPANY, A CORPORATION OF WEST VIRGINIA

METHOD OF ANNEALING FUSION WELDS

Application filed October 5, 1928. Serial No. 310,595.

This invention pertains to fusion welding and more specifically to a method of annealing such welds at the time they are made.

In fusion welding of the kind where two metal edges are melted and fused together by intense local heat such as that of the oxy-acetylene blowpipe or the electric arc traveling along the junction, the melted metal, after it cools, has a coarser structure and different physical properties from those of the metal before melting. Also, the metal near the weld, though not melted, has its structure coarsened and may have its ductility somewhat lowered. These differences in structure and physical properties are undesirable in some cases and they may be largely removed, and the weld metal and highly heated base metal improved, especially in ductility, by proper annealing, that is, by allowing them to cool down below a certain point, again heating them to another certain point for the proper length of time, and then allowing them to cool at the proper rate. The temperatures, time, and rate of cooling depend on the metal being welded, and on the composition of the welding rod providing the added metal, if any is used.

Steel is probably the most important metal welded, because it is the one that most often requires welds of high strength and ductility, and the method to be described is peculiarly adapted to welds in steel plate made with steel welding rods, though with proper limits of time and temperature, it is applicable to any metal that responds to annealing treatment.

Heretofore, the method of annealing fusion welds has been to allow the entire welded article to get cold, or nearly so, and then reheat it in its entirety, or at least the entire weld and the metal in its vicinity. This process is wasteful of both heat and time.

Therefore, one of the objects of this invention is a process of annealing fusion welds that is quick, economical, and effective. Other aims and objects will be apparent from the following description and illustration.

Figure 1:
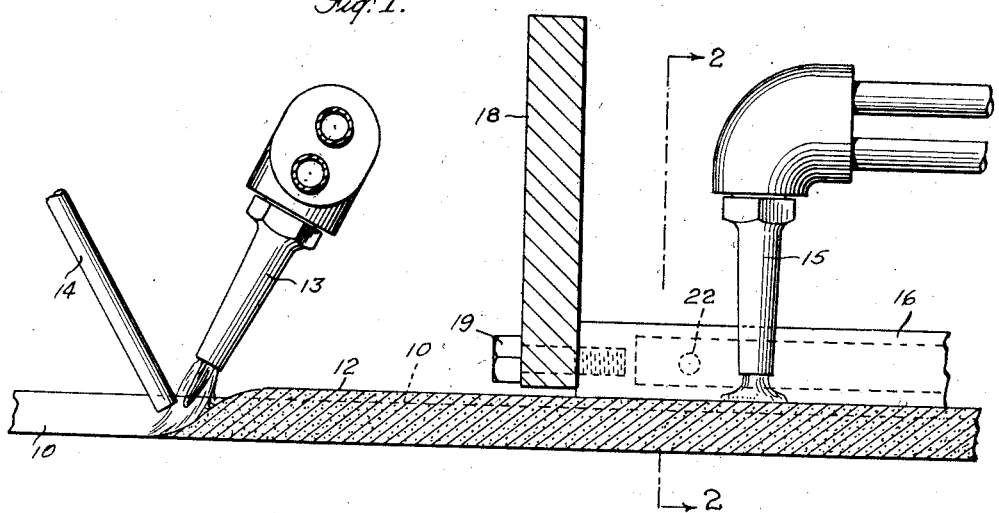
Figure 2:
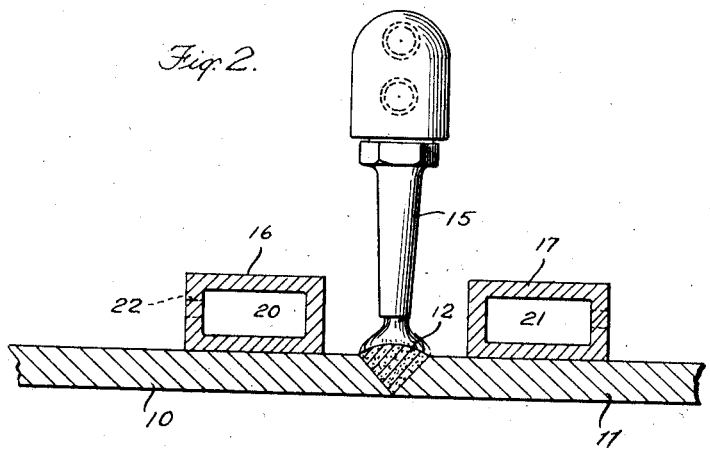

These aims and objects are attained by the mechanism illustrated in the accompanying drawings, in which:

Figure 1 is a longitudinal section of a weld with a portion of a welding rod, a welding blowpipe, an annealing blowpipe, and a baffle shown in elevation; and, Figure 2 is a transverse section along the line 2—2 of the apparatus shown in Figure 1.

In the drawings 10 and 11 are steel plates with their abutting edges suitably beveled and partially joined by a fusion weld 12. The weld 12 is being made by a welding blowpipe 13, of which only the head is shown, and the weld metal is being supplied by a welding rod 14. The welding blowpipe 13 is traveling from right to left.

Following the welding blowpipe 13 is a heating blowpipe 15 for annealing the weld 12. The heating blowpipe is traveling at the same speed as the welding blowpipe. The flame of the heating blowpipe 15 may be confined to an area near the weld 12 by baffles 16 and 17 of heat resisting material which may travel along the weld with the blowpipes 13 and 15. In case the flame from one of the blowpipes interferes with that of the other, the flames may be separated by a shield 18 attached to one or more of the baffles 16 and 17 by one or more bolts 19 so the shield 18 extends across the weld 12 between the blowpipes.

The weld 12 may be made with any source of welding heat such as the flame of an oxy-acetylene welding blowpipe 13 or a metal arc or a carbon arc. The source of welding heat may follow the junction line of the plates 10 and 11 in making the weld or it may be oscillated from side to side across the weld and the adjoining metal.

The weld may be reheated by the flame of an oxy-acetylene blowpipe 15 or by any other suitable flame such as that from a blowpipe using air or oxygen with city or natural gas. The baffles 16 and 17 may be of any heat resisting material such as iron, steel, carbon, graphite, or asbestos. They should be wide enough and deep enough so as not to be easily distorted by the heat, and if desired, they may be kept cool by passing a stream of water through them in the passages 20 and 21 by means of a suitable connection at each end such as the one shown at 22. The baffles 16 and 17 are not essential to the operation of the process, but they conserve the heat and reduce the cost.

The shield 18 may be any heat resisting material such as that used in the baffles and, like the baffles, the shield is not essential to the operation of the process although it contributes toward its economy and smoothness of operation.

In practice the welding blowpipe 13, welding rod 14, heating blowpipe 15, baffles 16 and 17, and shield 18, may be attached to a welding machine of a kind well known in the art. The welding blowpipe 13 and the welding rod 14 comprise the apparatus of the welding operation, and the heating blowpipe 15, the baffles 16 and 17, and the shield 18 the apparatus of the annealing operation. This welding and annealing apparatus may be attached to the welding machine so it travels over the joint in the steel plates 10 and 11 being welded, or the apparatus may remain stationary and the plates 10 and 11 being welded may pass underneath it. The distance between the welding and annealing operations may vary for different classes of welds, according to the composition and thickness of the plates being welded, and according to the speed at which the weld is made.

As the welding operation progresses, the temperature of the fused metal behind it falls until the heating blowpipe comes along, when it is again heated and then allowed to cool in atmosphere. The spacing between the welding operation and the annealing operation should be great enough to allow the fused metal behind the welding operation to cool to a temperature slightly below the lower critical range of the steel being welded. In structural steel and boiler plate containing from .15% to .25% carbon this point is about 1300° F. or slightly below. While best results will be secured by allowing the fused steel to cool to this point, some improvement will be had by letting it cool to any temperature between 1300° F. and 1500° F. After cooling to this temperature it is again heated by the heating blowpipe to a temperature slightly above the upper critical range of the steel being welded. In structural steel and boiler plate as described above this temperature is usually between 1525° F. and 1575° F. After reheating, the weld is allowed to cool in atmosphere at livable temperature.

The heating blowpipe 15 may produce much less heat than the welding blowpipe 13. The welding blowpipe must raise the metal from livable temperature, such as people live and work in, to about 2700° F., while the heating blowpipe will have to raise the temperature only from about 1250° F. to about 1500° F., a difference of about 250° F. The flame of the heating blowpipe may follow the weld or it may be oscillated from side to side across the weld and adjoining metal to distribute the heat uniformly. Also, the speed and amplitude of the oscillation may vary in order to heat the different thicknesses of metal in the joint to a uniform temperature.

Various changes may be made in the type and arrangement of the apparatus used in practicing this process without departing from the spirit of the invention or sacrificing any of the rights thereunder.

I claim:

1. Process of annealing a fusion weld in ferrous metal, which comprises cooling a freshly formed weld to a temperature just below the lower critical temperature of the metal, heating the so-cooled weld to a temperature just above the upper critical temperature of the metal, and then cooling the weld through the critical range.

2. Process of annealing a fusion weld in a ferrous metal containing from about .15% to about .25% carbon, which comprises cooling a freshly formed weld to a temperature of about 1300° F., heating the so-cooled weld to a temperature of from about 1525° F. to about 1575° F., and then air-cooling the weld through the critical range.

3. The combination with welding means, of annealing means comprising, a source of heat spaced from said welding means, means for confining said annealing heat to the weld produced by said welding means, and means for preventing said welding means and said annealing means from interfering with each other.

4. The combination with welding means comprising an oxy-acetylene blowpipe producing a welding flame, of annealing means comprising an oxy-acetylene blowpipe producing a heating flame, and means for moving said welding means along a junction between metal plates to make a fusion weld, and also for moving said annealing means along said weld a certain distance behind said welding means to anneal said weld.

5. The combination with welding means comprising an oxy-acetylene blowpipe producing a welding flame; of annealing means comprising an oxy-acetylene blowpipe producing a heating flame; means for moving said welding means along a junction between metal plates to make a fusion weld, and also for moving said annealing means along said weld a certain distance behind said welding means to anneal said weld; and means for confining said heating flame to an area near the weld.

6. The combination with welding means comprising an oxy-acetylene blowpipe producing a welding flame; of annealing means comprising an oxy-acetylene blowpipe producing a heating flame; means for moving said welding means along a junction between metal plates to make a fusion weld, and also for moving said annealing means along said weld a certain distance behind said welding means to anneal said weld; means for confining said heating flame to an area near the weld; and means for preventing said welding flame and said heating flame from interfering with each other.

In testimony whereof, I affix my signature.

SAMUEL W. MILLER.